(12) United States Patent
Hamid et al.

(10) Patent No.: US 10,430,324 B2
(45) Date of Patent: Oct. 1, 2019

(54) SYSTEM AND METHOD FOR AUTOMATED INTELLIGENT MOBILE APPLICATION TESTING

(71) Applicant: SMARTLYTICS LLC, Bellevue, WA (US)

(72) Inventors: Syed Hamid, Redmond, WA (US); Justin Hartin, Bellevue, WA (US)

(73) Assignee: SMARTLYTICS LLC, Bellevue, WA (US)

( * ) Notice: Subject to any disclaimer, the term of this patent is extended or adjusted under 35 U.S.C. 154(b) by 0 days.

(21) Appl. No.: 15/869,013

(22) Filed: Jan. 11, 2018

(65) Prior Publication Data

US 2018/0329813 A1    Nov. 15, 2018

Related U.S. Application Data

(60) Provisional application No. 62/445,200, filed on Jan. 11, 2017.

(51) Int. Cl.
*G06F 9/44*        (2018.01)
*G06F 11/36*       (2006.01)

(52) U.S. Cl.
CPC ...... *G06F 11/3696* (2013.01); *G06F 11/3688* (2013.01); *G06F 11/3692* (2013.01)

(58) Field of Classification Search
CPC ............. G06F 11/3688; G06F 11/3692; G06F 11/3696
USPC .................................................. 717/124–135
See application file for complete search history.

(56) References Cited

U.S. PATENT DOCUMENTS

| 8,978,014 B1* | 3/2015 | Larsen ................ G06F 11/3668 717/125 |
| 9,430,364 B1* | 8/2016 | Ryan ................... G06F 11/3664 |
| 9,858,174 B2* | 1/2018 | Straub ................. G06F 11/3684 |
| 9,990,110 B1* | 6/2018 | Lounibos .............. G06F 3/0484 |

OTHER PUBLICATIONS

Mulikita, "Mobile Application Testing", 2012, University of Applied Sciences Cologne, Germany, 25 pages (Year: 2012).*
Gomez et al., "Mining Test Repositories for Automatic Detection of UI Performance Regressions in Android Apps", 2016, ACM 13th Working Conference on Mining Software Repositories, pp. 13-24 (Year: 2016).*
Graham Odds, "Contextual cues in user interface design", 2010, retrieved from https://blog.scottlogic.com/2010/05/19/contextual-cues-in-ui-design.html, 5 pages (Year: 2010).*

* cited by examiner

*Primary Examiner* — Ted T. Vo
(74) *Attorney, Agent, or Firm* — Brian R. Galvin; Galvin Patent Law LLC

(57) ABSTRACT

A system for automated mobile application testing and activity monitoring where the mobile app runs on one of a plurality of available mobile devices running an operating system supported by the testing system. The automated testing system intelligently exercises each user interface element on each screen of the test mobile app for expected function, creating a graphical map of screen relationship and links in the process. Summary reports on user interface element function, mobile app usability and programming remediation hints on detailed pages may be displayed or sent to a client's software engineer task tracking package.

16 Claims, 9 Drawing Sheets

SYSTEM AND METHOD FOR AUTOMATED INTELLIGENT MOBILE APPLICATION TESTING

CROSS-REFERENCE TO RELATED APPLICATIONS

This application claims the benefit of, and priority to U.S. patent application Ser. No. 62/445,200, titled "SYSTEM AND METHOD FOR AUTOMATED INTELLIGENT MOBILE APPLICATION TESTING" and filed on Jan. 11, 2017, the entire specification of which is incorporated herein by reference in its entirety.

BACKGROUND

Field of the Art

The present invention is in the field of use of computer systems in business information management, operations and predictive planning. Specifically, the use of an automated, intelligent system for mobile application testing.

Discussion of the State of the Art

Application testing has been a required task of software development since the advent of the computer. As might be expected, the task began as a fully manual endeavor with the process greatly exacerbated by the need to introduce all patches into the code using manual punch cards or tapes and the paucity of computer time available to run those patched programs once submitted. The arrival of interactive modes of interaction with the computer greatly streamlined application development including the testing and patching of applications in development. However, an application found to function correctly in-house at the developing corporation often is shipped containing defects or "bugs," some serious including abnormal ending of the application or crashing of the entire computer system, that do not emerge until all aspects and use combinations of the application's features are tested, a task that is resource prohibitive if done manually. Even the use of external "alpha" and "beta" testers may take a prohibitively long period of time and has not been shown to uncover even serious bugs with sufficient regularity. Recently, programs have been written with the sole purpose of exhaustively exercising other programs, the applications in development. These testing system programs function continuously and extremely rapidly, finally allowing such exhaustive exercise of all application features in all plausible combinations and have greatly advanced the area of application testing. Unfortunately, to date the vast majority of the test system programs are very ridged in what they do and are written to test a single or extremely small subset of applications under development.

Nothing has increased the demand for new application development than the recent significant popularity of mobile devices including, but not limited to smart phones and tablets. This demand shown left older methods of prerelease application testing sorely inadequate, even the newer method of writing advanced but rigid single application test program systems.

What is needed is an automated mobile application test system that may be given basic human interaction processes for most or all mobile apps, a small number of specific directives for a specific mobile app to be tested and may then use techniques of artificial intelligence predictive analytic learning to exercise all interactive user interface elements of applications in such a fashion that the same system is generalized for use in the exhaustive feature testing of all possible mobile apps.

SUMMARY

Accordingly, the inventor has developed a system for automated intelligent mobile application testing which both accepts human training directives and uses predictive learning to exhaustively train bots and to exercise mobile application user interface (UI) elements and present unexpected behavior events, usability predictions and improvement recommendations to a service subscribing client.

According to one aspect, a system for automated intelligent mobile application testing comprising: a mobile application testing module stored in a memory of and operating on a processor of a computing device and configured to: receive a mobile application for testing from an external source, install and run the mobile application onto a plurality of mobile devices each connected to the mobile application testing module, exercise each user interface element on each screen of the mobile application to predictively analyze correct behavior of that element using contextual cues found on each screen of the mobile application, previously learned behavioral expectations, and human entered directives while simulating human interaction with those elements, create a relationship representation of all screens of the mobile application, identify any deviation of behavior of user interface elements that make up the mobile application from predictively expected behavior for that element and receive, normalize and integrate directives from a client's software engineer item tracking package. Further, a test results output module stored in a memory of and operating on a processor of a computing device and configured to: format a plurality of results received from the mobile application testing module to best accomplish the intended function of those results is disclosed.

According to another aspect, a system for automated intelligent mobile application testing has been reduced to practice. In the system, at least one of the mobile devices runs the APPLE IOS™ operating system, at least one of the mobile devices runs the GOOGLE ANDROID™ operating system, at least one of the mobile devices runs the MICROSOFT WINDOWS™ operating system, at least one of the test result output module formats is a user interface element behavior summary report for elements of the mobile application that was tested, at least one of the test result output module formats is a detailed program and machine state report for human display, at least one of the test result output module formats is a report that provides metric derived usability scores and advice on remedy choices, at least one of the test result output module formats is to be sent to the client's software engineer item tracking package, and, at least one relationship representation of all screens of the mobile application is in the form of a multidimensional graph.

According to another aspect, a method for automated intelligent mobile application testing is disclosed using steps comprising: a) retrieving a mobile application to be tested from an external source using a mobile application testing module stored in a memory of and operating on a processor of a computing device; b) installing and running the mobile application in the mobile application testing module using standard automation application programming interfaces; c) exercising each user interface element on each screen of the mobile application to predictively analyze correct behavior of that element using contextual cues found on each screen of the mobile application, previously learned behavioral expectations, and human entered directives while simulating human interaction with those elements; d) creating a relationship representation of all screens of the mobile application using results of navigational element activation by the mobile application testing module; e) identifying any deviation of behavior of user interface elements that make up the mobile application from predictively expected behavior for that element using the mobile application testing module; f) receiving, normalizing and integrating directives from a client's software engineer item tracking package using a third-party software engineering service normalizer. g) formatting a plurality of results received from the mobile application testing module to best accomplish the intended function of those results using a test results output module stored in a memory of and operating on a processor of a computing device.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
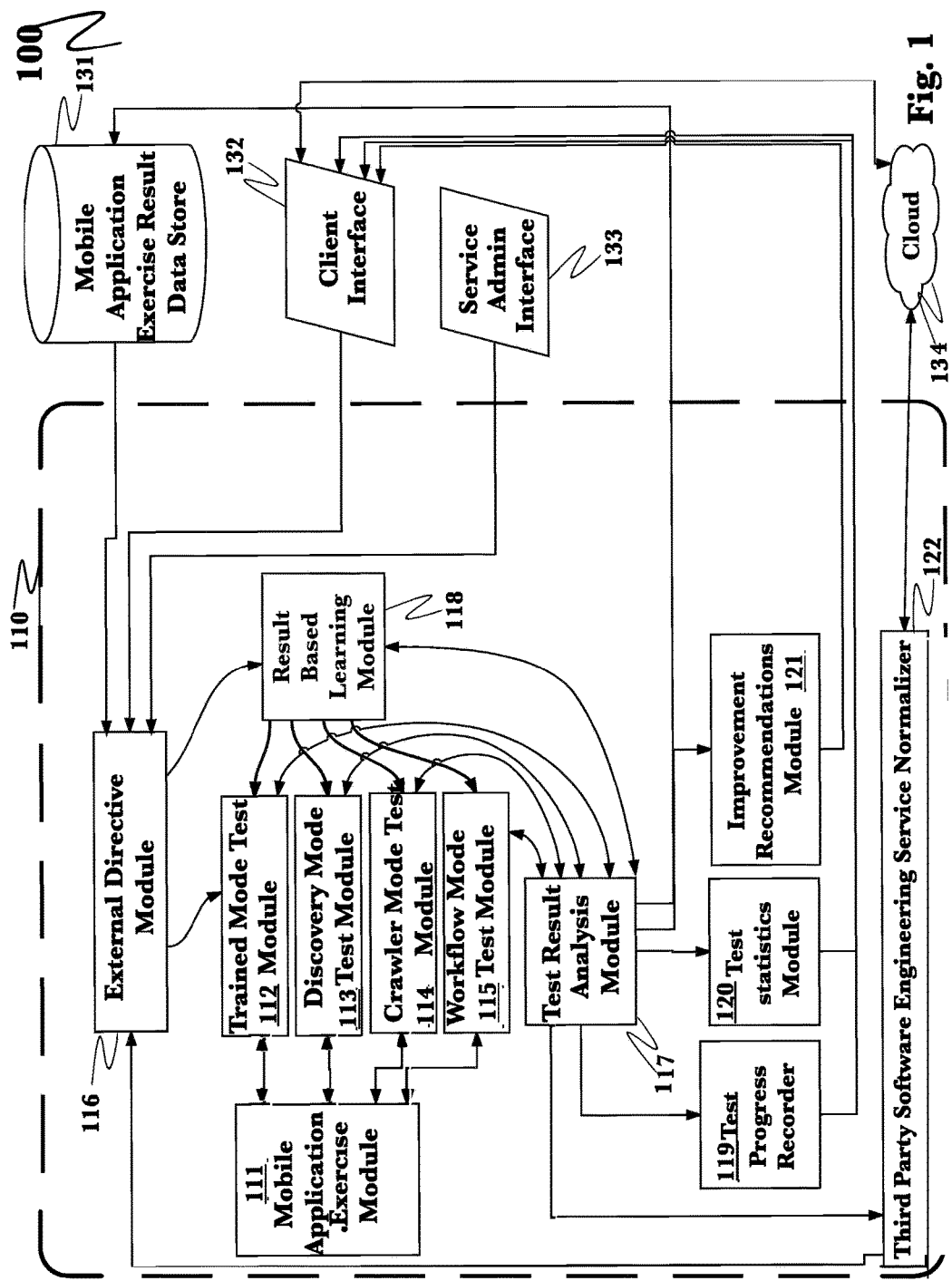
FIG. 1 is a diagram of an exemplary architecture of an intelligent mobile application testing system according to one aspect.

The inventor has conceived, and reduced to practice, a system for automated intelligent mobile application testing.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a diagram of an exemplary architecture 100 of an intelligent mobile application testing system according to one aspect. Mobile applications (mobile apps) to be tested by the mobile application testing system 110 may be run on a mobile app exercise module that is an integral part of the mobile application testing system 111 but the mobile app testing system is designed to allow these apps to be tested while running directly on any one of the available devices on which the mobile app is designed to run, wherein the device being tested is connected to, and directed by, the mobile application testing system 110 operating as a controller to send operation request to the operating system on the device for execution. The mobile app may be run on several different devices during the full testing process, which may test platform specific performance characteristics such as GOOGLE ANDROID™ vs. APPLE iOS™ vs. MICROSOFT WINDOWS™ mobile app versions for OS platform specific programming deficiencies; multiple individual devices representing the same OS platform which may test OS version differences in mobile app performance within the range of OS versions designated as supported by the mobile app being tested, for example iOS™ v.8 vs. v.9 vs v.10 or ANDROID LOLLIPOP™ vs. MASHMALLOW™ vs. NOUGAT™, just to name a few likely examples from the larger set. Further, multiple mobile devices of different supported types such as but not limited to smartphones, tablets, or wearable devices, and from different vendors such as SAMSUNG™ smartphones, tablets, smartwatches, or virtual-reality (VR) headsets of different models, LG™ smartphones, tablets, or smartwatches of different models and MOTOROLA™ smartphones or smartwatches, among the many types and models known to those skilled in the art, may be tested for differences in battery performance characteristics, graphics display failures, abnormal program ends and program progress halts, to name just a few possible mobile device model effects when using the mobile app undergoing analysis. General test suites for a mobile app category such as appointment/schedule calendar maintenance, virtual store front, social media gateway or mathematically based utility, just to name a few of many possibilities, may be pre-loaded by either a service administrator 133 or possibly the test client using a menu or some other similar choice vehicle 132 known to those skilled in the art, depending on the category into which the mobile app to be tested belongs. Under other conditions, or given other arrangements, the intelligent mobile application testing system may independently identify the category of the current test mobile app from graphic item content and action cues present on its screens. The pre-load of general test suite directives may also cause the retrieval of information generated from past tests of similar software either by the intelligent mobile application testing system or isolated stored and provided by another, external source of such information 122, normalized for intelligent mobile application testing system use and locally stored, possibly both depending on the particular arrangement or use case, from a mobile application exercise result data store 131. This information may be used to allow intelligent scrutiny of possible issues often present in the mobile app category, allow comparative usability scores to be assigned and to allow recommendations regarding the remedy of found deficiencies in the present mobile app under test to be proposed 121. The introduction into, and use of externally entered data by, is coordinated by an external directive module 116 during intelligent mobile application testing system runs. The test of a particular mobile app by the intelligent mobile application testing system may occur using any of four specialized test progression modes, although at any given instant of the test run, only one mode is active.

One such test mode is the discovery mode 113 which may be used primarily when the intelligent mobile application testing system encounters a screen (or node) of the test mobile app of new or unknown functionality. When that condition is met, the software engineered mechanism that the intelligent mobile application testing system uses to traverse and exercise the screens and user interface (UI) elements of the test mobile app, herein subsequently called a bot, assesses which UI components of the node may receive interactive user commands. For example, which components may respond to click or tap commands, which components may receive text input and which component or components may respond to more complex gestures such as swipes, flicks or pinches, just to name a few of the many possible gestures available to a mobile app programmer. For each screen reference to each UI component, whether it responds directly or possibly indirectly to some form of user interactive command, and its position on the screen is saved as part of the screen's node representation internal to the intelligent mobile application testing system. The discovery mode assessment is partially done from standard automation information, but standard information may be very limited and, in some cases, may be entirely incorrect. Therefore, the invention includes heuristic programming algorithms that improve the accuracy of determining what interaction commands are possible on the screen. This is generally based on such cues as the type of control(s) used to implement the screen layout and content, and where on the screen to simulate the interaction command although this list is not meant to limit the types of interactions investigated by the invention. For example, sometimes a child control is reported to be unresponsive to interaction commands but it has a parent or ancestor control that is registered to respond to commands. Depending on the control types of the ancestor and the parent, this may be a clue to not direct the command to the ancestor control but to the child instead. The reason is based upon a generally good guess that a child control has a higher z-order in the UI layout than the ancestor control. With a higher z-order, the child control is on top of the ancestor. Therefore, scenarios where this is the case are searched for, and if so the command is directed to the child control even though the child control is reported to be unresponsive. This works because the ancestor control acts as a surrogate, and eventually receives and processes the command as long as it originated from within the x & y coordinate boundaries of the child control and no other dependent child control has an even higher z-order than the target control. Of course, the previous is just one of multiple possible examples of how the heuristic programming embodied in the invention may allow greater interactive feature investigation by better reproducing the actions a human user may perform during use than by just randomly activating interactive elements, but the example should in no way be interpreted to limit the invention to identifying and correctly traversing similar UI construction methods. Next the bot must decide what action or actions should be taken in order to exercise this portion of the application and/or discover additional functionality further into the application. This decision may be aided using both intra-mobile app predictive analytics provided by any existing test results 117 and any learning allowed by the synthesis of those results into predictive insight 118, and any previous data retrieved on similar mobile apps 131 and made available to the system 116. Once a set of actions are thus determined, the bot makes an assessment regarding success or failure regarding the actions taken. In discovery mode, success is achieved if each of the following hold true: the application did not crash; the application did not throw any exceptions; the application did not popup an error message to the UI; and, the screen has changed in some way regarding either control composition or content when compared to the screen present before any actions were taken. Otherwise it is recorded that an application failure has occurred because of activation of the tested interactive component. This information is sent to the in the raw result analyzer 117. Regardless of success or failure, the bot continues in discovery mode which means it tries to continue to explore the application for pathways that have not yet been traversed.

A second test mode which may be used by aspects of the invention is crawler mode 114. Crawler mode is invoked when the bot is traversing through a mobile app, and arrives at points in a mobile app where "forward exploration" is no longer possible. Therefore, the bot needs to go back to a previously known node in the mobile app in order to explore other areas of the mobile app that have not been explored or have been only partially explored. Such reverse traversal may be as simple as the going to the previous screen using an available back button interactive component, but in many cases traversal through nodes is not linear. So "going back" may not provide much utility. Also, some mobile apps do not support a "back" button at all. The system thus uses a statistical weighting of all unexercised UI components under these circumstances. The system creates a ranking of the likelihood of how much functionality sits behind each UI component to select a current node resident interactive component with the highest probability of leading to a previously mapped area of the mobile app. Once the target UI component is chosen, then an application graph constructed by linking mobile app screens together in a multi-dimensional graph represented relationship is used to determine the location of the test bot within the mobile app node structure and the action steps needed to traverse known paths from the current node in the mobile app to a desired node where still unexplored UI components may be accessed. Also, some paths within a test mobile app may be either transient or unidirectional, so the bot's first attempt to determine the sequence of pathways may not always yield an expected result. Therefore, the bot must recognize differences in application behavior from expected behavior, update the multidimensional graph of mobile app nodes accordingly, and devise a new strategy for navigating through the application to the desired node. This process repeats until the desired node is reached.

A third testing mode that may be used by aspects of the intelligent mobile application testing system, training mode 112 is invoked when one or more nodes of the mobile app require specific text information such as but not limited to a username, password, name of a particular object or name of a person of geographical location; a specific activation sequence of multiple interactive UI components of other set of actions specific to an individual or group known to those skilled in the art. To traverse such specific types of interface elements where trial and error using random text entry or UI component activation will not result in successful traversal of a screen of the mobile app, the client may elect to teach the intelligent mobile application testing system the interaction information required using the client interface 132, which is shown in this arrangement as being local to the test system for illustrative purposes, but may also be remote and connected over an network including a VPN tunneled on the internet 134. In action, the bot may be explicitly trained for an exact set of actions on a particular screen, if desired. The client may use the client interface portal 132 to identify the application screen on which it wants to train the bot by visually selecting UI control components one by one, specifying the correct action to be performed by the test system at that control and/or entering any specific value to populate into the control in the cases of text responses. Each screen is a unique node in the application multi-dimensional graph. So the trained action and values is created under the graph point specified by the combination of the node identifier plus the unique UI control component identifier. When the bot is running and encounters a matching node and control(s), the trained actions and values are used by the bot to traverse through that node of the application.

A last testing mode that may be used by the aspects of the intelligent mobile application testing system is a workflow mode 115. Two workflow types are modelled by the intelligent mobile application testing system. One type involves a series of actions that span multiple screens (nodes) to complete a task. A good example is the "check-out" process for a store front application. Typically, there are multiple screens, one asking for shipping information, then one for billing information, one for confirmation of items in the shopping basket, and then finally a screen to review an order a final time in its final form and submit the order, at which time the customer has committed to the order items and her credit card or bank account is charged. This type of workflow requires many action steps before determining success or failure of the task. A second type of workflow is where actions taken on one screen may only be verified for success or failure on another screen. For example, an appointment application allows you to create a new appointment specifying such items as an appointment name, location, date, time, and duration, among other possible pieces of information. But to determine whether the entry is logged correctly often requires traversal to the correct month, day, and time of day to verify if the appointment is showing correctly. The first type of workflow may be detected by looking for a combination of textual and navigational hints. For example, text labels in the node match a dictionary of likely candidates (phone, address, and billing, among other possibilities.). Multiple text input fields on the same screen. And navigational buttons or links labelled next, previous, continue, etc. Determining success or failure for the workflow is reserved until there is a screen that denotes a completed flow, such as "order placed" or "reservation made." The invention is programmed to successfully fully exercise this type of workflow using standard testing store front protocols and to identify and report and deficiencies or deviations from expected results both catastrophic, where the application crashes or the process never successfully completes, and more subtle, where use of a back button or entry of incomplete information on a screen results in order reset, double charge or other failure states familiar to those skilled in the art which allow a user to progress in use of the mobile app but mildly to significantly diminish the usability of the tool from the point of view of the user. The second type of workflow is detected from the context of creating a new item inside the mobile app, such as an appointment or new contact. Attributes from the create new item context are used to find the item elsewhere in the application. For example, the date and time of an appointment or the name of a contact. Again, the invention includes programming to identify, traverse and exercise this second type of workflow as outlined directly above. Abnormal program ends, program progress halts, and more subtle failures which may include failure to transfer schedule or other list data from an input screen to the correct receiver fields either within the running mobile app or within another co-resident mobile app, among other defects known or likely to diminish user experience are captured and analyzed.

Regardless of the testing mode that the system uses, test results are normalized and interpreted within the test result analysis module 117. This module receives raw results from the bots working in any mode and analyzes them for known success or failure indicators as well as previously uncharacterized deviation from expected UI interactive component behavior. Analysis may make use of the analytic capabilities of the results based learning module 118 to predictively interpret the significance of unknown result data. Analyzed result data for a mobile app may be permanently stored in the mobile application exercise result data store 131 for both later retrieval and review and possibly for use as a usability characteristic reference during testing of similar mobile apps. The raw bot generated data may also be stored in the data store 131 for future re-analysis or review as new resources become available. Analyzed result data, raw bot data or both may also be transmitted to a client's software engineering issue tracking system such as: JIRA™, BUGZILLA™, SLACK™, and VSO™ to name a subset of the trackers available as normalized for transmission 134 to each of these services through the third-party software engineering service normalizer 122. This allows mobile app test results to serve as a part of the client's overall software management schema rather than an isolated, add-on service that must then be manually integrated into client workflow. The utility of the intelligent mobile application testing system to software—software engineering issue tracking system communication channel is augmented in that various aspects of the invention are designed to accept updated mobile app code and testing directives from the client through the third-party software engineering service normalizer 122 and will then exercise the new mobile app revision for issues including reversions. Analysis results are passed on to a test progress recorder 119 to provide clients with an indication of what screens have been tested and what is still left to complete as well as certain meaningful interim results, if available. The system also uses test results analyzed using preprogrammed mobile app data metrics for a plurality of core functions to provide clients with standalone usability statistics, statistics indicating the mobile app's stability when subjected to specific challenges and usability in comparison to other mobile apps in the same category among other statistics known useful to those skilled in the art but not listed for brevity's sake 120. A client may get more detailed descriptions of application abnormal ends, loss of responsivity issues, slow responsiveness, as well as subtler usability issues, possibly including the program instructions that form the root cause that may be presented in a client controllable video format that provides the exact mobile app screen status images with synchronized internal program instructions and key variable values which may be finely controlled for both playback location and playback speed through the services of the improvement recommendations module 121 which will also, when appropriate and available, provide recommendations on how an issue may be resolved. All information produced by the test statistics module 120 and improvement recommendations module 121 may be permanently saved in a data store record for the mobile app tested 131 as well as being directly displayed to the client 134, 132.

Figure 2:
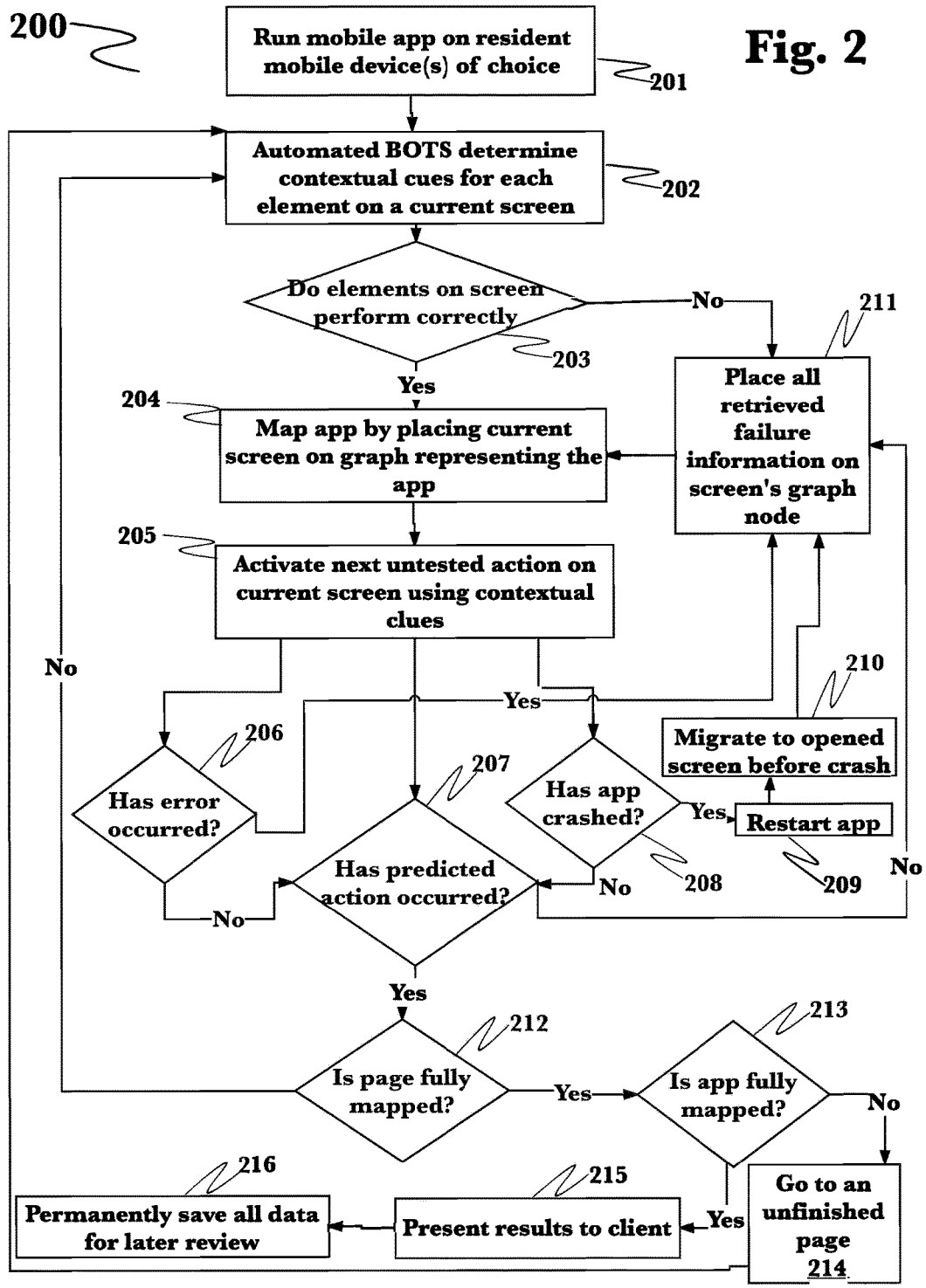
FIG. 2 is a method flow diagram of the function of the intelligent mobile application testing system according to one aspect.

FIG. 2 is a method flow diagram 200 of the function of the intelligent mobile application testing system according to one aspect. While some arrangements may run a test mobile app on a dedicated module which is integral to the intelligent mobile application testing system 111, it is expected that mobile apps will be tested on a plurality of the mobile devices available from the plurality of manufacturers present at the time of testing using the native operating system of those devices such as but not necessarily limited to APPLE IOS™, GOOGLE ANDROID™, and MICROSOFT WINDOWS™ and under installation and execution control of the intelligent mobile application testing system through standard automation APIs 201. Automated bots then crawl through the mobile app under test such as using contextual hints that are part of the mobile app's screen (also referred to as "node" herewithin) progression, types of UI elements present on a screen and UI interactive element placement in that progression, among other hints known to those skilled in the art, and both previously learned mobile app traversal logic and explicit human directives pertaining to the successful traversal of certain UI elements found in the current mobile app where specific information of element activation progression may be needed to simulate human like interactions for each element within the mobile app 202.

Responses to UI element exercise may be tested 203 against preprogrammed, learned or client provided expected results for that element to determine whether the element functions correctly. Unexpected results are recorded on a graphical representation of the mobile app generated by the intelligent mobile app test system along with other data pertaining to the current screen or node 211. Regardless of whether unexpected behavior is found with an element, the intelligent mobile app test system works to completely map each element's function and node relationships for the entire mobile app 204 by activating each UI interactive element present on each screen encountered 205. This mapping of a mobile app by the intelligent mobile application testing system may occur using four specialized test progression modes, although at any given instant of the test run, only one mode is active.

One such test mode is the discovery mode 113 which may be used primarily when the intelligent mobile application testing system encounters a screen of the test mobile app of new or unknown functionality. When that condition is met, the bot assesses which UI components of the node may receive interactive user commands. For example, which components may respond to click or tap commands, which components may receive text input and which component or components may respond to more complex gestures such as swipes, flicks or pinches, just to name a few of the many possible gestures available to a mobile app programmer. For each screen reference to each UI component, whether it responds directly or possibly indirectly to some form of user interactive command, and its position on the screen is saved as part of the screen's node representation internal to the intelligent mobile application testing system. The discovery mode assessment is partially done from standard automation information, but standard information may be very limited and, in some cases, may be entirely incorrect. Therefore, the invention includes heuristic programming algorithms that improve the accuracy of determining what interaction commands are possible on the screen. This is generally based on such cues as the type of control(s) used to implement the screen layout and content, and where on the screen to simulate the interaction command although this list is not meant to limit the types of interactions investigated by the invention. For example, sometimes a child control is reported to be unresponsive to interaction commands but it has a parent or ancestor control that is registered to respond to commands. Depending on the control types of the ancestor and the parent, this may be a clue to not direct the command to the ancestor control but to the child instead. The reason is based upon a generally good guess that a child control has a higher z-order in the UI layout than the ancestor control. With a higher z-order, the child control is on top of the ancestor. Therefore, scenarios where this is the case are particularly searched for, and if so the command directed to the child control even though the child control is reported to be unresponsive. This works because the ancestor control acts as a surrogate, and eventually receives and processes the command as long as it originated from within the x & y coordinate boundaries of the child control and no other dependent child control has an even higher z-order than the target control. Of course, the previous is just one of multiple possible examples of how the heuristic programming embodied in the invention may allow greater interactive feature investigation by better reproducing the actions a human user may perform during use than by just randomly activating interactive elements, but the example should in no way be interpreted to limit the invention to identifying and correctly traversing similar UI construction methods. Next the bot must decide what action or actions should be taken in order to exercise this portion of the application and/or discover additional functionality further into the application. This decision may be aided using both intra-mobile app predictive analytics provided by any existing test results 117 and any learning allowed by the synthesis of those results into predictive insight 118, and any previous data retrieved on similar mobile apps 131 and made available to the system 116. Once a set of actions are thus determined, the bot makes an assessment regarding success or failure regarding the actions taken. In discovery mode, success is achieved if each of the following hold true: the application did not crash 208; the application did not throw any exceptions 206; the application did not popup an error message to the UI 206; and, the screen has changed in some way regarding either control composition or content when compared to the screen present before any actions were taken 207. Otherwise it is recorded that an application failure has occurred because of activation of the tested interactive component which is saved as part of the element's node in the mobile app's multidimensional graph representation 211. Regardless of success or failure, the bot continues in discovery mode which means it tries to continue to explore the application for pathways that have not yet been traversed.

A second test mode which may be used by aspects of the invention is crawler mode 114. Crawler mode is invoked when the bot is traversing through a mobile app, and arrives at points in a mobile app where "forward exploration" is no longer possible. Therefore, the bot needs to go back to a previously known node in the mobile app to explore other areas of the mobile app that have not been explored or have been only partially explored. Such reverse traversal may be as simple as the going to the previous screen using an available back button interactive component, but in many cases traversal through nodes is not linear. So "going back" may not provide much utility. Also, some mobile apps do not support the "back" button at all. The system thus uses a statistical weighting of all unexercised UI components under these circumstances. The system creates a ranking of the likelihood of how much functionality sits behind each UI component to select a current node resident interactive component with the highest probability of leading to a previously mapped area of the mobile app. Once the target UI component is chosen, then an application graph constructed by linking mobile app screens together in a multi-dimensional graph represented relationship is used to determine the location of the test bot within the mobile app node structure and the action steps needed to traverse known paths from the current node in the mobile app to a desired node where still unexplored UI components may be accessed. Also, some paths within a test mobile app may be either transient or unidirectional, so the bot's first attempt to determine the sequence of pathways may not always yield an expected result. Therefore, the bot must recognize differences in application behavior from its expected behavior, update the multidimensional graph of mobile app nodes accordingly, and devise a new strategy for navigating through the application to the desired node. This process repeats until the desired node is reached.

A third testing mode that may be used by aspects of the intelligent mobile application testing system, training mode 112, is invoked when one or more nodes of the mobile app require specific text information such as but not limited to a username, password, name of a particular object or name of a person of geographical location; a specific activation sequence of multiple interactive UI components of other set of actions specific to an individual or group known to those skilled in the art. To traverse such specific types of interface elements where trial and error using random text entry or UI component activation will not result in successful traversal of a screen of the mobile app, the client may elect to teach the intelligent mobile application testing system the interaction information required using the client interface 132, which is shown in this arrangement as being local to the test system for illustrative purposes, but may also be remote and connected over an network including a vpn tunneled on the internet 134. In action, the bot may be explicitly trained for an exact set of actions on a particular screen, if desired. The client may use the client interface portal 132 to identify the application screen on which it wants to train the bot by visually selecting UI control components one by one, specifying the correct action to be performed by the test system at that control and/or entering any specific value to populate into the control in the cases of text responses. Each screen is a unique node in the application multi-dimensional graph. So the trained action and values is created under the graph point specified by the combination of the node identifier plus the unique UI control component identifier. When the bot is running and encounters a matching node and control(s), the trained actions and values are used by the bot to traverse through that node of the application.

A last testing mode that may be used by various aspects of the intelligent mobile application testing system is a workflow mode 115. Two workflow types are modelled by the intelligent mobile application testing system. One type involves a series of actions that span multiple screens (nodes) to complete a task. A good example is the "checkout" process for a store front application. Typically, there are multiple screens, one asking for shipping information, then one for billing information, one for confirmation of items in the shopping basket, and then finally a screen to review an order a final time in its final form and submit the order, at which time the customer has committed to the order items and her credit card or bank account is charged. This type of workflow requires many action steps before determining success or failure of the task. A second type of workflow is where actions taken on one screen may only be verified for success or failure on another screen. For example, an appointment application allows you to create a new appointment specifying such items as an appointment name, location, date, time, and duration, among other possible pieces of information. But to determine whether the entry is logged correctly often requires traversal to the correct month, day, and time of day to verify if the appointment is showing correctly. The first type of workflow may be detected by looking for a combination of textual and navigational hints. For example, text labels in the node match a dictionary of likely candidates (phone, address, and billing, among other possibilities.). Multiple text input fields on the same screen. And navigational buttons or links labelled next, previous, continue, etc. Determining success or failure for the workflow is reserved until there is a screen that denotes a completed flow, such as "order placed" or "reservation made." The invention is programmed to successfully fully exercise this type of workflow using standard testing store front protocols and to identify and report and deficiencies or deviations from expected results both catastrophic, where the application crashes or the process never successfully completes, and more subtle, where use of a back button or entry of incomplete information on a screen results in order reset, double charge or other failure states familiar to those skilled in the art which allow a user to progress in use of the mobile app but mildly to significantly diminish the usability of the tool from the point of view of the user. The second type of workflow is detected from the context of creating a new item inside the mobile app, such as an appointment or new contact. Attributes from the create new item context are used to find the item elsewhere in the application. For example, the date and time of an appointment or the name of a contact. Again, the invention includes programming to identify, traverse and exercise this second type of workflow as outlined directly above. Abnormal program ends, program progress halts, and more subtle failures which may include failure to transfer schedule or other list data from an input screen to the correct receiver fields either within the running mobile app or within another co-resident mobile app, among other defects known or likely to diminish user experience are captured and analyzed 206.

During the course of analysis, it is possible that a mobile app may abnormally end due to a catastrophic error 208. Under these circumstances, the intelligent mobile app testing system is designed to first recognize this condition and, as no further mapping and analysis of the mobile app would be possible in that state, restart the mobile app 209 placing a bot on the last known active screen 210 and recording both the UI element's failure along with all available diagnostic information for the element on that screen's graph node 211 as well as insuring that the defective element is avoided. The progression of fully mapped screens 212, 214 eventually will result in the full mapping of the mobile app 213 at which time the results may be presented in the client 215, possibly in the form of statistics for stability, instantaneous and predicted resource usage on the host device of mobile app functions, standalone usability, and comparative usability with other known mobile apps in the same category among other statistics known to those skilled in the art. Another form of presentation may be a finely controllable video representation of the bot's activities during mobile app mapping including available machine state information of selected interest to the client with the ability to zoom to areas of unexpected programming behavior including program stops and abnormal ends among other possible defects. These could then be reviewed "frame by frame" to allow troubleshooting of the issue. More extensive dumps of mobile device memory may also be sent to the client's software engineering package 122 to aid in correction, if desired. All data may also be saved to a data store 131 for later review 216.

Figure 3:
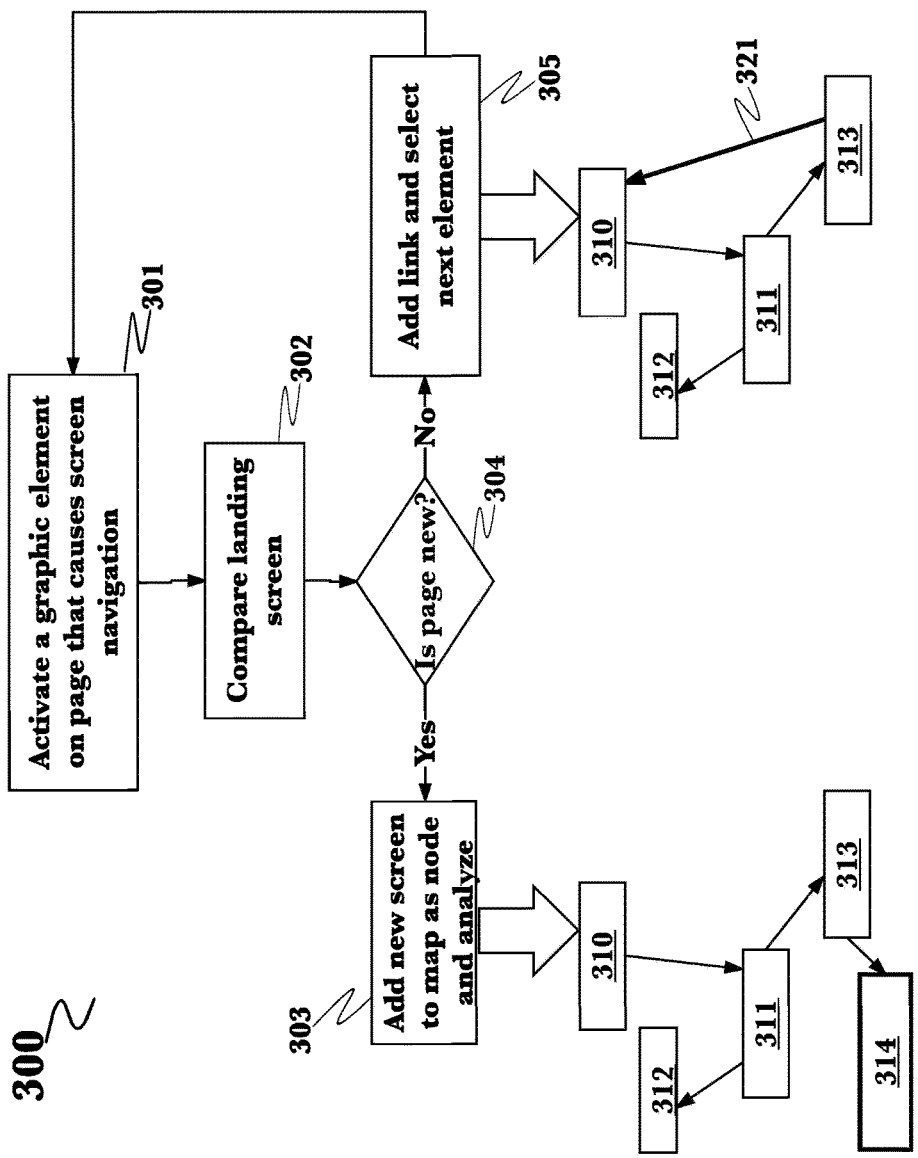
FIG. 3 is a flow diagram of an exemplary function of the intelligent mobile application testing system for mapping the navigational relationships between pages of a mobile application.

FIG. 3 is a flow diagram 300 of an exemplary function of the intelligent mobile application, testing system for mapping the navigational relationships between pages of a mobile application according to one aspect. An important aspect of analyzing the function any mobile app is an accurate representation of the relationships between the mobile app's screens (which may also be referred to as "nodes" herein). The intelligent mobile app testing system performs this mapping by activating each UI interactive element on each screen starting with the first screen presented upon mobile app startup 301. This first screen is given the top node representation 310 in a multidimensional map that the system creates as it does its mapping. The resultant screen of a UI interactive element 311, 312, 313, if screen navigation is the UI element's action, is compared to all previously encountered pages 302 and if the screen has not previously been encountered 304, a new node is created and added to the map 303 for the new screen 314, placed in dimensional relationship to previously created nodes by contextual clues encountered during previous mapping of mobile app and predictive analytic learning. Analysis of the UI elements on the new screen is then begun possibly employing contextual cues, explicit human directives for that screen and prior predictive analytic learning which may include but is not limited to inferential statistics, linear regression, decision trees and data feedback loops to best mimic human interaction. New nodes are thus added until all screens of the mobile app are discovered and added to the graph type mapping. Activation of an interactive UI element may also cause a bot, and therefore, by extension a human user to be taken to a previously encountered screen 304 for multiple mobile app design reasons. During mobile app testing, such an eventuality may cause only a new link 321 (line darkened only for illustrative emphasis) between the source node and the target node to be created. If unanalyzed interactive UI elements exist on the previously graphed landing node, the bot will then concentrate on characterizing one or more of those elements until taken to another mobile app screen 305. Multidimensional graphical mapping continues until all interactive UI elements have been analyzed and no further links are found present.

Figure 4:
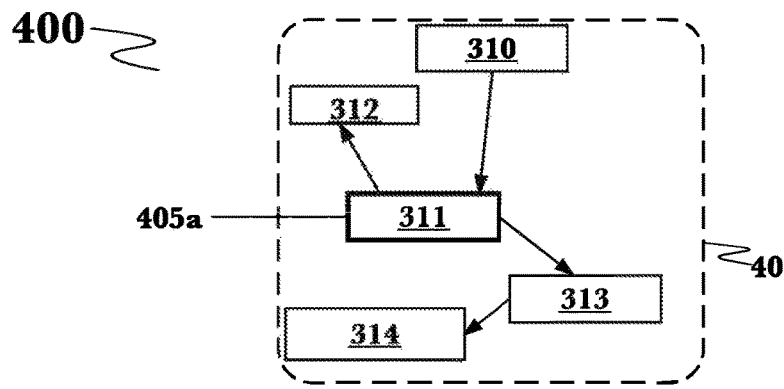
FIG. 4 is an illustration of an analysis summary screen for a page of a hypothetical mobile application produced as part of the function of the intelligent mobile application testing system according to one aspect.
Figure 4:
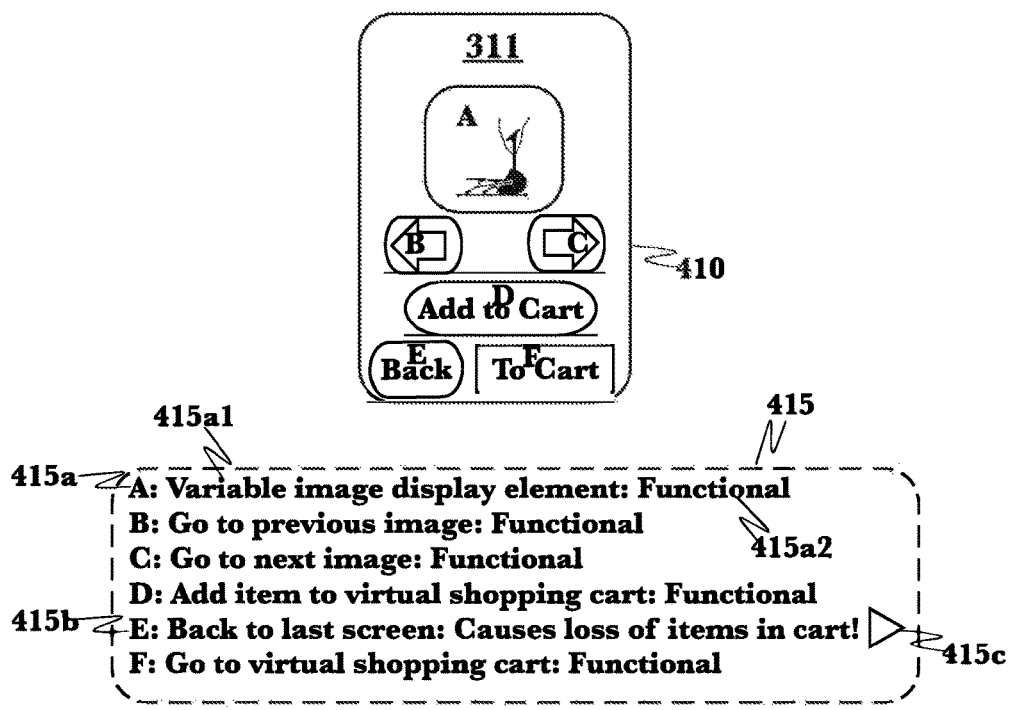

FIG. 4 is an illustration of an analysis summary screen 400 for a page of a hypothetical mobile application produced as part of the function of the intelligent mobile application testing system as per one aspect. To be useful data resultant of any analysis is best presented in formats that are both intelligible to the recipient of that data and in such ways that the data may be quickly digested with the possibility of exposing greater detail should the recipient desire. Shown here is one possible static type display of data created by an aspect of the invention of the plurality that may be created to summarize the functional status of a mobile app's UI elements 410, 415. Here, the client may select the node, or screen of interest 405*a* from the multidimensional graph representation created by the system (see FIG. 3) 405. Node selection here brings up a display of the selected mobile app screen 410 with its UI elements labeled for later reference (410A, 410B, 410C, 410D, 410E, 410F) 415. The screen 410 is a simplified representation of an item search and selection screen that may display in the early-mid screen progression of a shopping app. UI element 410A may show the available items for purchase once a merchandise category is selected elsewhere. The item to be displayed 410A being controlled by elements 410C which is to cause the display of the next item in the merchant's inventory offerings for the category and 410B which causes the display of the previous item in the merchant's inventory offerings for the category, together meant to allow full access to available category items. UI element 410D is meant to allow the mobile app user to add an item of choice for purchase to a virtual shopping cart, displayed on another screen accessed by the activation of UI interactive element 410F. The mobile app user may also return to the preceding screen 410E, for example to change merchandise categories once all desired selections in the current category are made, although other possible reasons for returning to the previous page may exist.

Below the graphical representation 410 of the client selected node 405*a* is a list type summary display of the results of intelligent mobile app testing system analytical exercise of the mobile app screen chosen by the client 415. The list includes a UI element's reference 415*a* (A, 401A) from the screen graphic representation panel 410, a short description of the activity ascribed to the UI element by the testing system 415*a*1 and a brief descriptor of the test system's functional findings for that element 415*a*2, which for 415*a* indicates that no functional issues were found. From the display, it may be quickly determined that most of the UI elements for node 311 405*a*, 410 exhibit only expected behaviors and are given a "Functional" designation. UI element 410E, however is reported by the testing system to have had a possibly serious action programming defect as using the "Back" UI interactive element to return designated previous page results in the loss of items already added to the cart 415*b*. A client may then choose to display more detailed information on the defect by activating an icon present next to the reported issue 415*c*. The expanded detail may be displayed in manners such as but not limited to a pop-up window that opens on the same testing system test result page as the summary, opens a new page to display the results interactively where multiple layers of increasing detail may be available, sending all pertinent detail information to the clients software engineer issue tracking system or other actions familiar to those skilled in the art for displaying or queuing such information for action.

Figure 5:
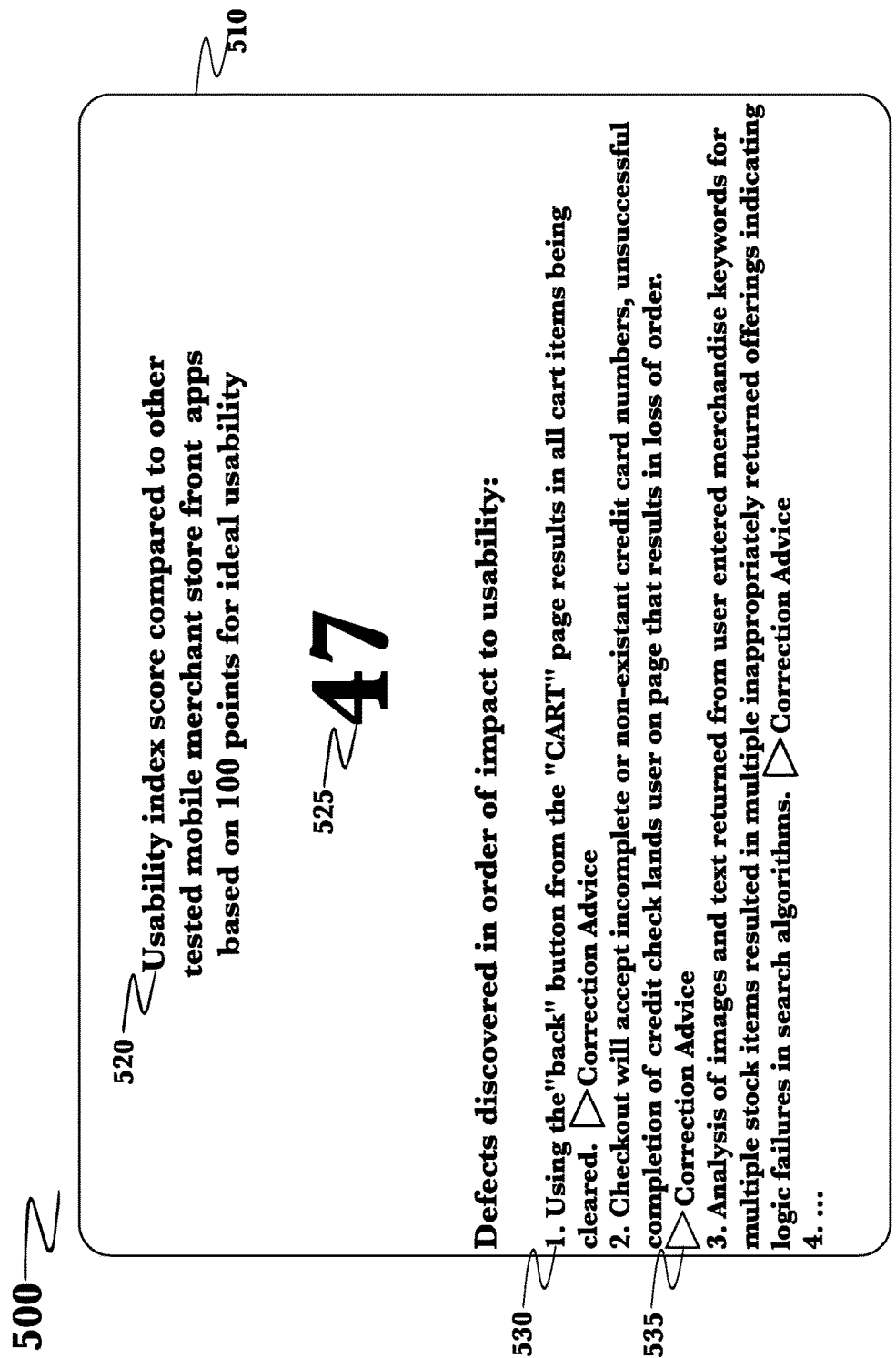
FIG. 5 is an example mobile application usability summary screen produced as part of the function of the intelligent mobile application testing system according to one aspect.

FIG. 5 is an example mobile application usability summary screen 500 produced as part of the function of the intelligent mobile application testing system according to one aspect. The system also uses information supplied by either previous mobile app test results or supplied from other sources if available, to rate the usability of the current test mobile app. Usability summaries may be standalone usability ratings calculated using metrics for the expected behaviors of standard interactive UI elements that are present in the test mobile app, or comparative usability against overall other mobile apps in the same mobile app category, merchant storefront apps being a non-exclusive category example. A comparative usability report display 510 may contain a header stating the category chosen by the test system and which may also establish the rating range used 520. The current test mobile apps comparative usability score may then be given 525 followed by a list of test system findings which contributed to the score. These factors may occasionally be positive if the mobile app author has used a particularly effective, efficient or innovative method, perhaps combinations of all three characteristics, to accomplish a function of the mobile app (not shown) but will usually be a list of defects of deficiencies that could or need to be improved to better the mobile app 530. In addition to the probable listing of items in need of correction, each item may provide a mechanism 535 by which the client may receive more specific programming issues that may have led to the negative finding as well as possible information on how to affect the corrective change or changes to remedy each deficiency found. These data may be displayed by pop-up window on the same client display screen or activation of the icon to display the advice information 535 may open a dedicated window, possibly offering a hierarchy of corrective information detail for the client to choose at their discretion. The client may also be given an option to send all pertinent intelligent mobile app testing system discovered programming, machine state and remediation advice text for one or more of the reported defects 530 to their software engineer package for inclusion into the client's standard bug tracking policy.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
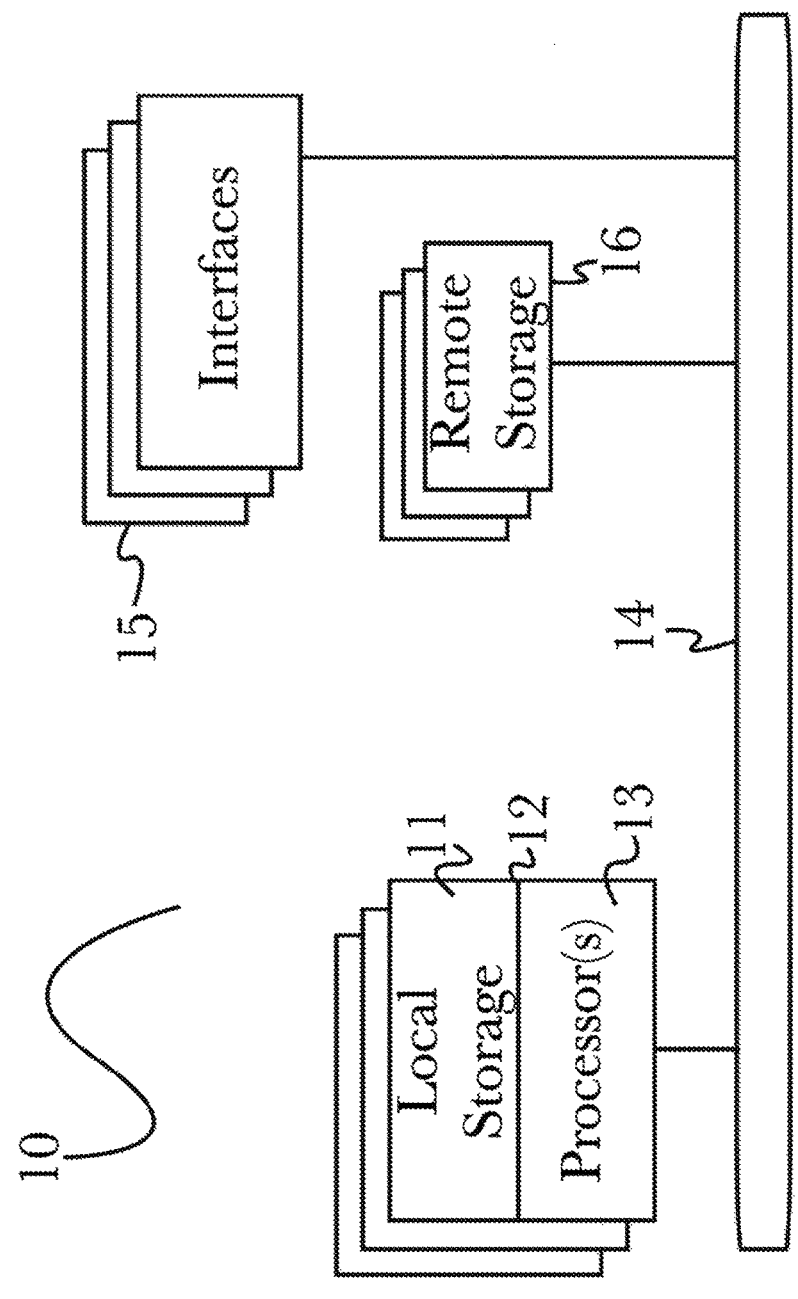
FIG. 6 is a block diagram illustrating an exemplary hardware architecture of a computing device.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
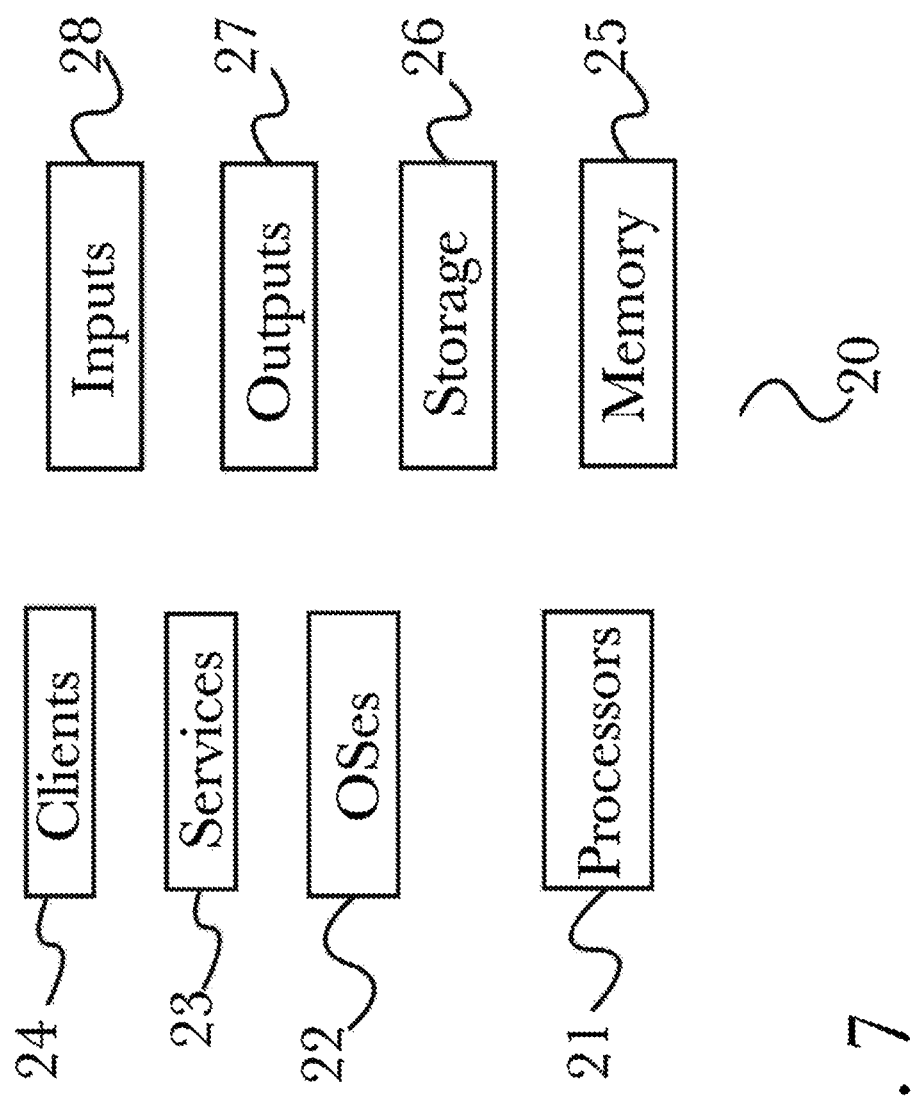
FIG. 7 is a block diagram illustrating an exemplary logical architecture for a client device.

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
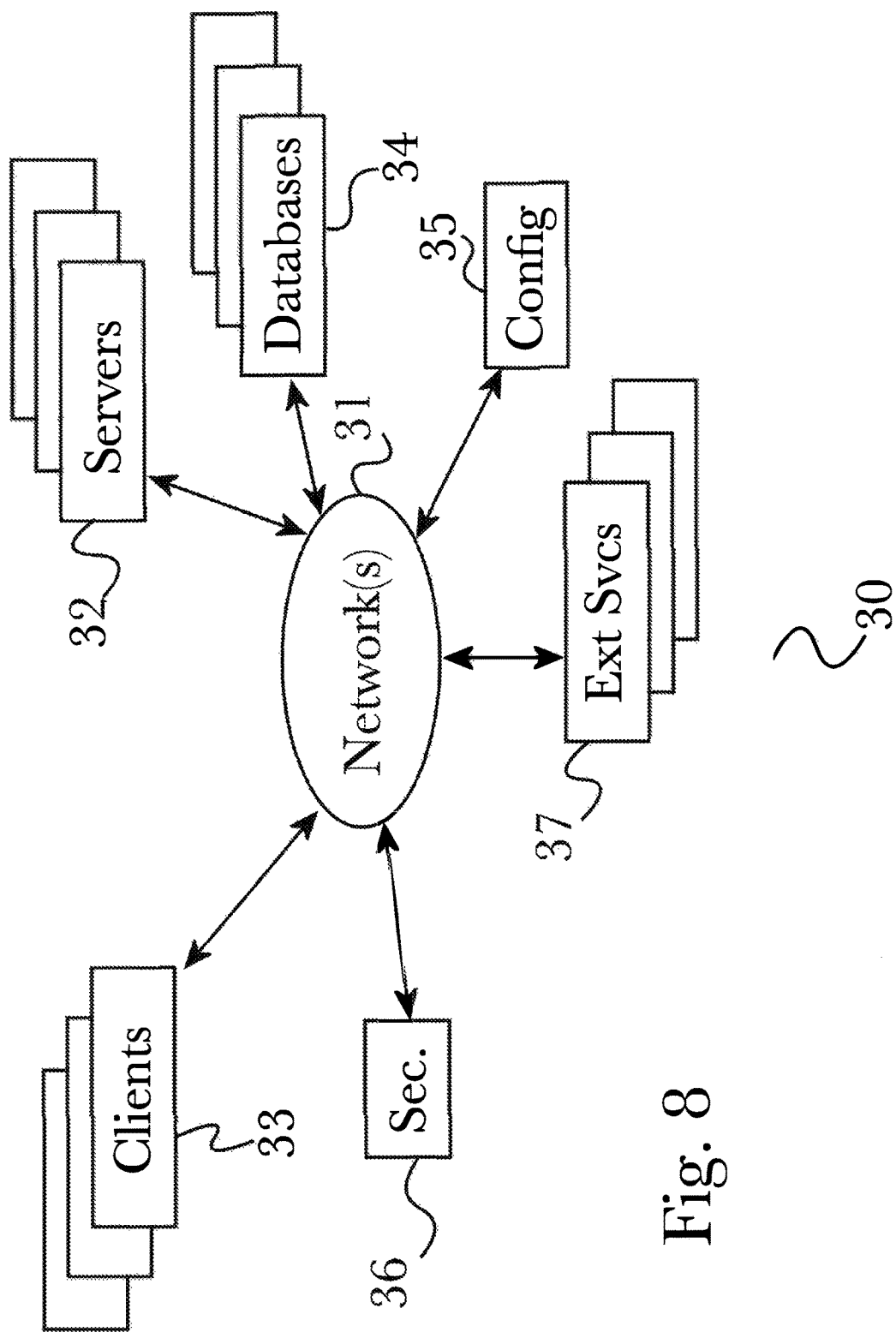
FIG. 8 is a block diagram illustrating an exemplary architectural arrangement of clients, servers, and external services.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
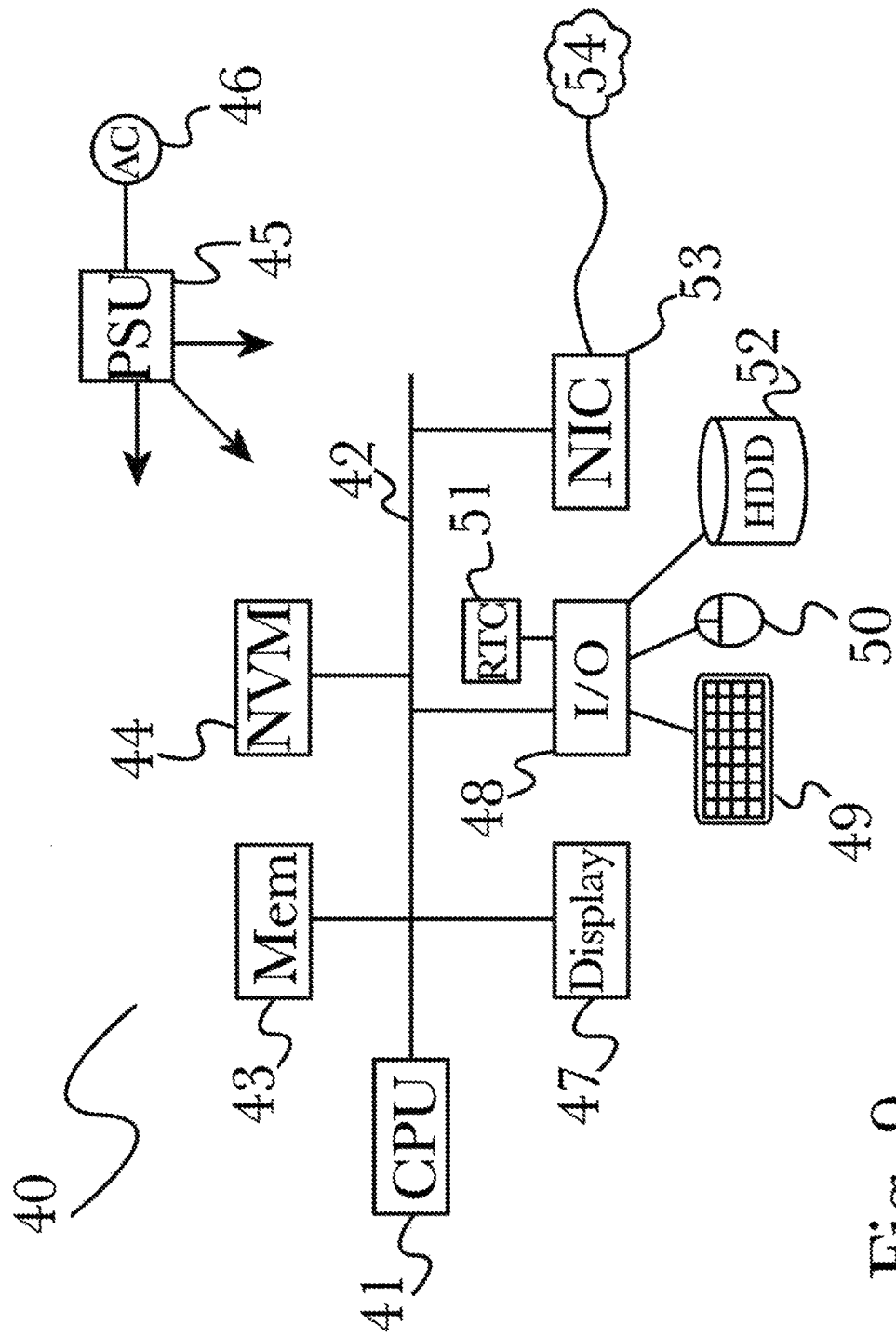
FIG. 9 is another block diagram illustrating an exemplary hardware architecture of a computing device.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automated intelligent mobile application testing comprising:
   a mobile application testing module stored in a memory of and operating on a processor of a computing device and configured to:
      receive a mobile application for testing from an external source;
      communicate with a mobile device via a plurality of standard application programming interfaces;
      direct an operating system of the mobile device to install the mobile application;
      identify and exercise each of a plurality of user interface elements on each of a plurality of screens presented by the mobile application, analyzing contextual clues present in the plurality of user interface elements to predict correct behavior of that element while simulating human interaction with those elements;
      create a relationship representation of a plurality of screens presented by the mobile application;
      identify any deviation in behavior of any user interface elements tested from predictively expected behavior for that element;
      communicate with an issue tracking system; and
   a test results output module stored in a memory of and operating on a processor of a computing device and configured to:
      format a plurality of results received from the mobile application testing module to best accomplish a predetermined function of those results.

2. The system of claim 1, wherein the predictive analysis is based at least in part on a plurality of previously-learned behavioral expectations.

3. The system of claim 1, wherein the predictive analysis is based at least in part on a plurality of instructions received from the issue tracking system.

4. The system of claim 1, wherein at least one of the test result output module formats is a user interface element behavior summary report for elements of the mobile application.

5. The system of claim 1, wherein at least one of the test result output module formats is a detailed program and machine state report configured for presentation to a user for review.

6. The system of claim 1, wherein at least one of the test result output module formats is a report that provides metric derived usability scores and advice on remedy choices.

7. The system of claim 1, wherein at least one of the test result output module formats is transmitted to the issue tracking system.

8. The system of claim 1, wherein at least one relationship representation of a plurality of screens of the mobile application is in the form of a multidimensional graph.

9. A method for automated intelligent mobile application testing comprising the steps of:
   a) retrieving a mobile application to be tested from an external source using a mobile application testing module stored in a memory of and operating on a processor of a computing device;
   b) directing, using a plurality of application programming interfaces, the operating system of a mobile device to install and run the mobile application;
   c) identifying and exercising each of a plurality of user interface elements on each of a plurality of screens presented by the mobile application, analyzing contextual clues present in the plurality of user interface elements to predict correct behavior correct behavior of that element while simulating human interaction with those elements;
   d) creating a relationship representation of a plurality of screens presented by the mobile application;
   e) identifying any deviation in behavior of any user interface elements tested from predictively expected behavior for that element;
   f) communicating with an issue tracking system; and
   g) formatting a plurality of results received from the mobile application testing module to best accomplish a predetermined function of those results using a test results output module stored in a memory of and operating on a processor of a computing device.

10. The method of claim 9, wherein the predictive analysis is based at least in part on a plurality of previously-learned behavioral expectations.

11. The method of claim 9, wherein the predictive analysis is based at least in part on a plurality of instructions received from the issue tracking system.

12. The method of claim 9, wherein at least one of the test result output module formats is a user interface element behavior summary report for elements of the mobile application.

13. The method of claim 9, wherein at least one of the test result output module formats is a detailed program and machine state report configured for presentation to a user for review.

14. The method of claim 9, wherein at least one of the test result output module formats is a report that provides metric derived usability scores and advice on remedy choices.

15. The method of claim 9, wherein at least one of the test result output module formats is transmitted to the issue tracking system.

16. The method of claim 9, wherein at least one relationship representation of a plurality of screens of the mobile application is in the form of a multidimensional graph.

* * * * *